Aug. 28, 1928.  
J. V. MARTIN  
VEHICLE SPEED CONTROL  
Filed March 1, 1926　　3 Sheets-Sheet 1

1,682,297

INVENTOR  
*James V. Martin*

Aug. 28, 1928.

J. V. MARTIN 1,682,297

VEHICLE SPEED CONTROL

Filed March 1, 1926     3 Sheets-Sheet 2

INVENTOR
James V. Martin

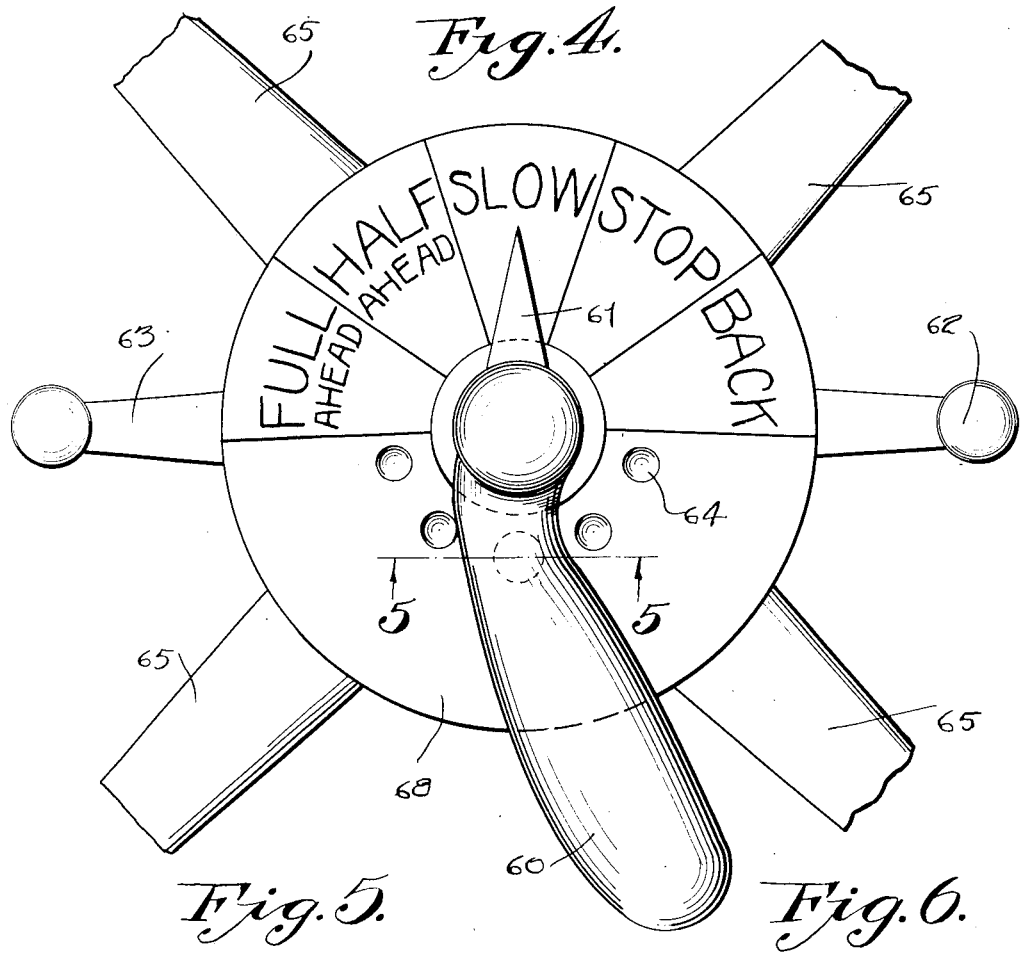
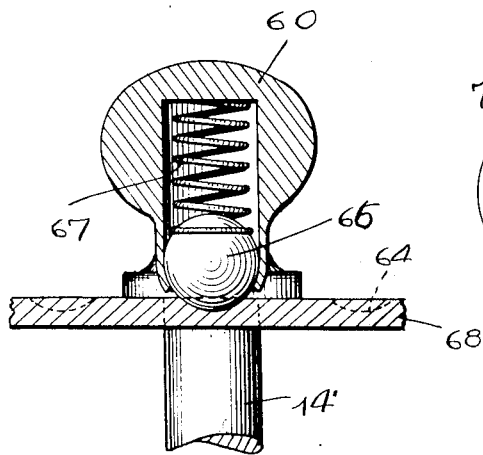
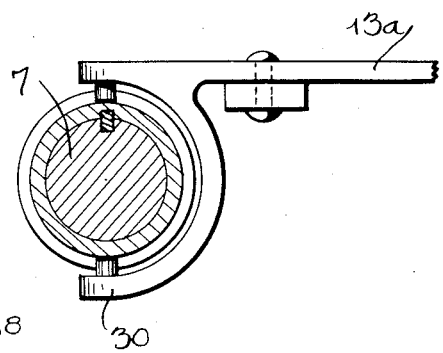

Patented Aug. 28, 1928.

1,682,297

UNITED STATES PATENT OFFICE.

JAMES V. MARTIN, OF GARDEN CITY, NEW YORK.

VEHICLE SPEED CONTROL.

Application filed March 1, 1926. Serial No. 91,409.

My invention relates to speed altering means for motor drives and is particularly adapted for use by aeroplanes, automobiles or by machine shops to alter line shaft speeds.

The primary object of my invention is to provide three speeds and reverse without requiring the shifting or meshing of gears.

A further object of my invention is to provide a simple, compact gear box containing certain gears always in mesh and to afford to an operator a convenient means of selectively driving through the said gear box at different speeds.

A further object of my invention is to make available to an operator or pilot the speed control of his motor drive located conveniently on his steering wheel.

Other objects of my invention will become readily apparent from the following disclosure:—

Fig. 4 is a view of the center of the steering wheel with the gear control installed.

Fig. 5 is a cross sectional view of the hand lever taken on the line 5—5 of Fig. 4.

Fig. 6 is an end elevational view of the full speed clutch lever taken on line 6—6 of Fig. 1 and looking away from the motor.

Figure 1:
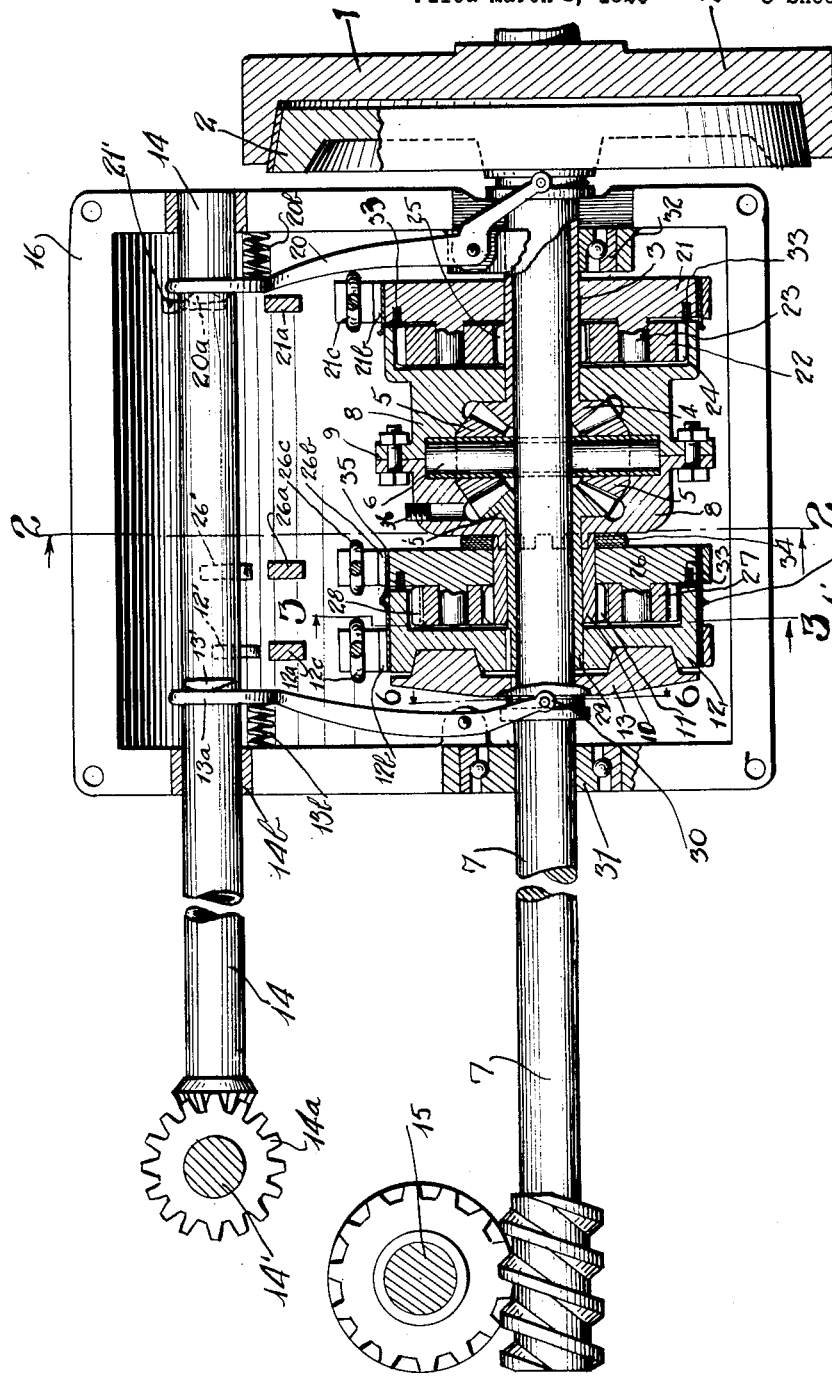
Fig. 1 is a side elevation of one adaptation of my invention as it might be arranged in an automobile or aeroplane.

Referring to the drawings by numerals, 1 indicates the fly-wheel of a motor, 2 the cone clutch of conventional design, 3 the splined shaft on which the clutch slides and 4 the bevel gear on the said shaft; 5 indicates the intermediate bevel gears journalled about the pin 6, which is rigid with and drives the worm drive shaft 7. The pin 6 is held in the casing 8 which is bolted together at 9. The casing 8 is dove tailed into a small shaft 10 which carries the spur teeth 11 while the full speed clutch 13 engages with the wheel 12. The control camshaft 14 causes the gears to transmit power from the flywheel 1 to the final axle shaft 15 in the following manner:—

When the hand lever 60, Fig. 4, is placed so that the indicator 61 registers on the space marked "Stop" the shaft 14' has revolved the camshaft 14 so that cam 20$^a$ has pressed lever 20 against the spring 20$^b$ so that it disengages the clutch 2 and the motor may drive the flywheel 1 without revolving any of the shafts or gears within the gear box 16 held together by bolts 17.

When the lever 60 is turned to register "Back" it causes shaft 14' to rotate camshaft 14 through bevel gear 14$^a$ so that the cam 20$^a$ releases lever 20 and engages cone clutch 2 with flywheel 1 and thus revolves splineshaft 3 and at the same time engages cam 21' with brake lever 21$^a$ on pin 21$^c$ supported by bracket 18 (Fig. 2) and this tightens brake band 21$^b$ against spring action 21$^d$ which otherwise holds brake band free of grip on wheel 21 which carries small spur gears 22 with teeth 24 rotating about the stub axles 23 and always in mesh with the internal gear of the casing 8 which rotates the pin 6 which drives the worm shaft 7 or final drive; it will be noticed that this shaft is driven in the opposite direction to the flywheel and shaft 3 by reason of the idler wheels 22 and that by regulating the relative diameter of the internal gear and the gears 25 on shaft 3, any desired reverse speed may be obtained.

When the lever 60 is turned to register "Slow" ahead the cam 21' turns so as to release the brake band 21$^b$ and free the wheel 21 so that it has no influence upon the speed of casing 8; at the same time the cam 26' engages lever 26$^a$ about pin 26$^c$ and tightens brake band 26$^b$ thus stopping and holding wheel 26 which has a bearing on short shaft 10 dovetailed with the casing 8 and carrying spur gear teeth 11 meshed with those of idlers 27 on wheel 26 which mesh with the internal gears 28 on wheel 12 which is keyed to the shaft 29 carrying bevel gear 5'. It will be seen that the wheel 12 must rotate in the opposite direction and much slower than shaft 10 and casing 8 by reason of the larger diameter of its internal gear and through the reversing action of the idlers 27, so that while the casing 8 would be driven forward at half speed if 5′ were held motionless it moves less than half speed in proportion to the amount which 5′ moves in the reverse direction. Obviously any desired speed of rotation can be obtained for the casing 8 and final drive 7 by regulating the relative diameters of 28 and 11.

When the hand lever 60 is moved to register "Half" ahead the brake 26$^b$ releases wheel 26 and holds wheel 12 through cam 12′, lever 12$^a$ on pin 12$^c$ and brake band 12$^b$, thus holding the shaft 29 to which it is keyed to wheel 12 and consequently bevel gear 5′, but this means that when the motor drives shaft 3 through clutch 2 the intermediate bevels 5 driven by 4 will rotate around pin 6 rolling on 5′ and thus carry the casing 8 forward at half speed or intermediate speed, and as shown before this motion is imparted to the final drive shaft 7.

When the hand lever 60 is registering full the cam 12′ has released the brake band 12$^b$ and by the tapered cam 13′ has pressed the lever 13$^a$ against spring 13$^b$ engaging clutch 13 through the clutch forks 30, but the bearing of this clutch is the splined shaft 7 or final drive thus the casing 8 and pin 6 is locked to the shaft 29 and bevel 5′ and consequently the bevel 4 will drive the casing 8 and all the surrounding gears and shafts at engine speed about the ball bearings 31 and 32, in housing 16.

As a means to keep oil from getting out of the gear casing 8 the anti-leak packings 33 are used and the packing ring 34, while the hardened brake bands, as 35 attached to 26 are flanged at 19 so that, should any oil leak by, it will be carried clear of the brake band surfaces. Bearings 14$^b$ are indicated in the housing 16 for the camshaft 14.

65 of Fig. 4 indicates the spokes of a typical steering wheel for auto or aeroplane: 62 the throttle control lever and 63 the spark control. 64 indicates shallow holes in the dial plate 68 into which the steel ball 66 is forced by the spring 67 in order to insure accurate centering of the control lever. The hand pressure will insure moving the ball out of the shallow holes against the spring when shifting to another register. The cams shown in Fig. 2 are merely typical of the desired arrangement and do not represent any actual position for the relations shown in Figs. 1 and 4. To be consistent with Fig. 1 the indicator 61 should show "Full" ahead. Fig. 2 is drawn as though the register was on "Back" and only two of the five cams would properly show on Fig. 2, the others are diagrammatic.

Figure 2:
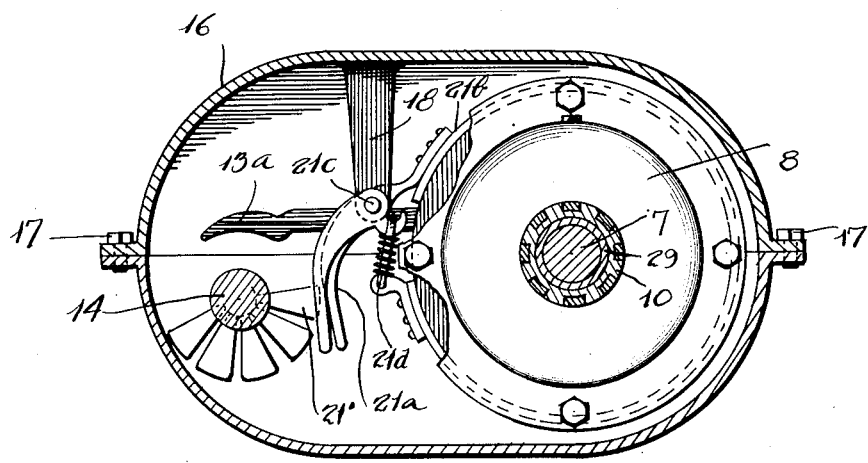
Fig. 2 is a view taken on the line 2—2 of Fig. 1 and shows in end elevation looking toward the motor the gear housing and control cam-shaft.
Figure 3:
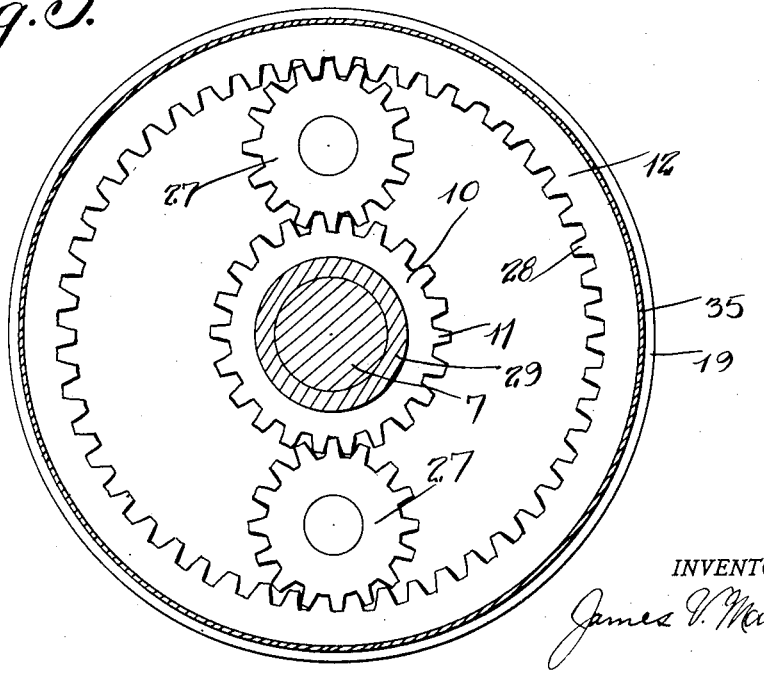
Fig. 3 is a view taken on the line 3—3 of Fig. 1 and shows in end elevation the gears at that position.

36 in Fig. 1 indicates an oil filler cap for the gears in casing 8 and the surrounding gears and shafts.

Many of the features indicated such as clutches, brake bands etc. are merely representative of conventional practices of widely varying forms and are not intended to be accurate in design and proportions as no effort is made or intended to claim as part of this invention special designs of clutches, brake bands, etc. The novelty of the invention will be found to reside in the relative positions and movements of the respective shafts and gears and in simplified control.

Obviously many changes may be made in the arrangement of parts and supports without departing from the spirit of the invention, which consists in the disclosure made herewith and more particularly pointed out in the following claims:—

1. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, and means to connect the second tubular shaft and the main shaft.

2. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, and a clutch lever for moving the clutch member into and out of engagement with the clutch disc.

3. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, and means to gear the clutch disc to said casing.

4. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second tubular shaft, a second friction disc revoluble on the third shaft, planetary gearing connecting the third tubular shaft and clutch disc and including idler gears carried by the second friction disc, a brake band surrounding the second friction disc, and a lever for operating said last mentioned brake band.

5. In a gearing of the kind described, a main shaft, a tubular drive shaft mounted on the forward end of the main shaft, a differential gear casing connected to the main shaft to revolve therewith, a second tubular shaft mounted on the main shaft to the gear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second tubular shaft, a second friction disc revoluble on the third shaft, planetary gearing connecting the third tubular shaft and clutch disc and including idler gears carried by the second friction disc, a brake band surrounding the second friction disc, a lever for operating said last mentioned brake band, a third brake band surrounding the clutch disc, and a lever for operating said third brake band.

6. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, and means for driving the first tubular shaft including a clutch and clutch operating lever.

7. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, means to gear the clutch disc to said casing, and means for driving the first tubular shaft including a clutch and clutch operating lever.

8. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second shaft, a second friction disc revoluble on the third shaft, planetary gearing connecting the third tubular shaft and clutch disc and including idler gears carried by the second friction disc, a brake band surrounding the second friction disc, a lever for operating said last mentioned brake band, and means for driving the first tubular shaft including a clutch and clutch operating lever.

9. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second shaft, a second friction disc revoluble on the third shaft, planetary gearing connecting the third tubular shaft and clutch disc and including idler gears carried by the second friction disc, a brake band surrounding the second friction disc, a lever for operating said last mentioned brake band, a third brake band surrounding the clutch disc, a lever for operating said third brake band, and means for driving the first tubular shaft including a clutch and clutch operating lever.

10. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, means for driving the first tubular shaft including a clutch operating lever, a manually operable cam shaft, and cams on said cam shaft for selectively engaging and operating the clutch and brake levers.

11. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, means to gear the clutch disc to said casing, means for driving the first tubular shaft including a clutch and clutch operating lever, a manually operable cam shaft, and cams on said cam shaft for selectively engaging and operating the clutch and brake levers.

12. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second shaft, a second friction disc revoluble on the third shaft, planetary gearing connecting the third tubular shaft and clutch disc and including idler gears carried by the second friction disc, a brake band surrounding the second friction disc, a lever for operating said last mentioned brake band, and means for driving the first tubular shaft including a clutch and clutch operating lever, a manually operable cam shaft, and cams on said cam shaft for selectively engaging and operating the clutch and brake levers.

13. In a gearing of the kind described, a main shaft, a tubular drive shaft mounted on the forward end of the main shaft, a differential gear casing connected to the main shaft to revolve therewith, a second tubular shaft mounted on the main shaft to the rear of the first tubular shaft, differential gearing in said casing including bevel gears on the adjacent ends of the tubular shafts and idler bevels carried by the casing and meshing with the first bevels, a friction disc revoluble on the first tubular shaft, planetary gearing connecting said first tubular shaft and the casing and including idler gears on the friction disc, a brake band surrounding said disc, a lever to operate the brake band, a clutch disc keyed on said second tubular shaft, a clutch member splined on the main shaft, a clutch lever for moving the clutch member into and out of engagement with the clutch disc, a third tubular shaft extending from the casing and rotatable on the second shaft, a second friction disc revoluble on the third shaft, planetary gearing connecting the third tubular shaft and clutch disc and including idler gears carried by the second friction disc, a brake band surrounding the second friction disc, a lever for operating said last mentioned brake band, a third brake band surrounding the clutch disc, a lever for operating said third brake band, means for driving the first tubular shaft including a clutch and clutch operating lever, a manually operable cam shaft, and cams on said cam shaft for selectively engaging and operating the clutch and brake levers.

In testimony whereof I affix my signature.

JAMES V. MARTIN.